G. B. CHILD.
COOKING OVEN.
APPLICATION FILED FEB. 23, 1916.
1,211,086.
Patented Jan. 2, 1917.
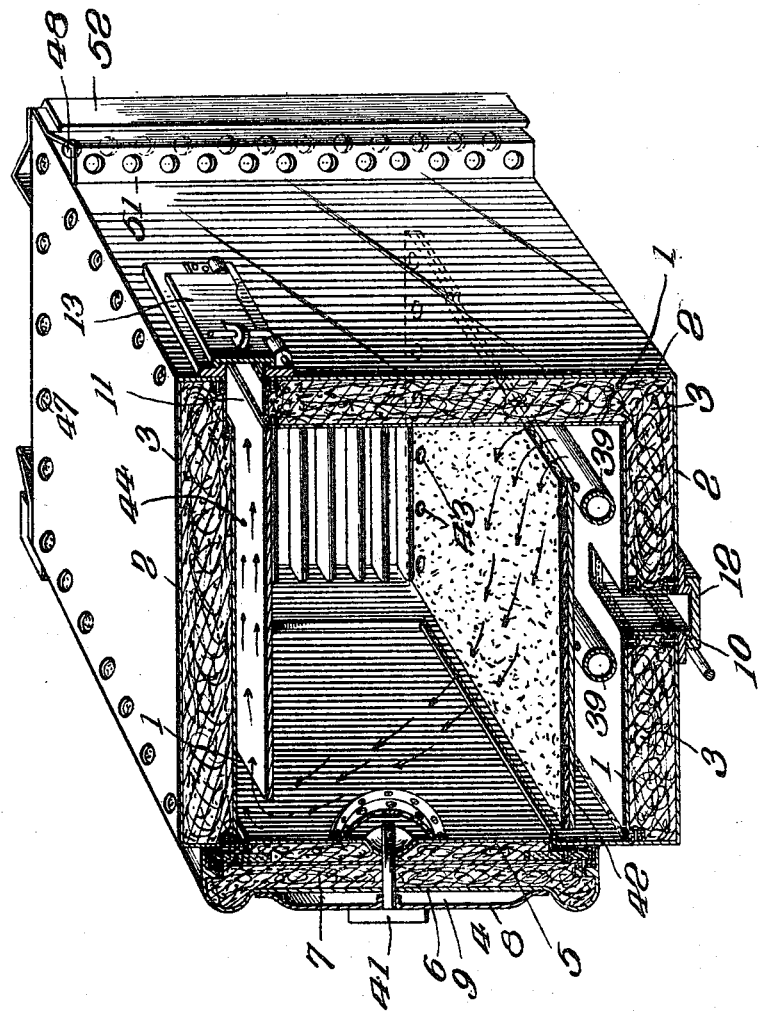

UNITED STATES PATENT OFFICE.

GUY B. CHILD, OF CHICAGO, ILLINOIS, ASSIGNOR TO AMERICAN STOVE COMPANY, OF ST. LOUIS, MISSOURI, A CORPORATION OF NEW JERSEY.

COOKING-OVEN.

1,211,086. Specification of Letters Patent. Patented Jan. 2, 1917.

Original application filed December 27, 1915, Serial No. 68,703. Divided and this application filed February 23, 1916. Serial No. 79,918.

*To all whom it may concern:*

Be it known that I, GUY B. CHILD, a citizen of the United States, residing at Chicago, in the county of Cook and State of Illinois, have invented certain new and useful Improvements in Cooking-Ovens, of which the following is a specification, reference being had therein to the acompanying drawing.

This invention relates to improvements in cooking ovens, and pertains to that class of cooking ovens which are adapted to be operated by the fireless cooker principle, whether gas or electricity is to be utilized for heating the oven.

This application is a division of my application filed December 27th, 1915, bearing Serial No. 68,703.

As is well known to those skilled in this art, in this class of ovens, it is necessary to provide a thick insulating wall composed of insulating material such, for instance, as asbestos or mineral wool in order to prevent the radiation and loss of heat through the walls of the oven, and to thereby retain the heat within the oven to complete the cooking operation.

It is also well known to those skilled in the art that there is moisture and steam from the food being cooked in an oven which is tightly closed and operating on the fireless cooker principle, and especially is this true when cooking meats, vegetables, and other moisture containing articles. It has long been recognized by those skilled in this art, that when the oven has been considerably used, the moisture and steam-laden air finds its way to the insulating material through the seams of the oven, and the insulating material absorbs it, and that when this condition is reached, the effectiveness of the insulating material is seriously reduced, and to such an extent that in the course of time it will become so serious as to almost destroy the insulating quality of the insulating material, and to that extent destroy the effectiveness of the fireless cooker principle of the oven.

The object of this invention is to provide means for ventilating the insulating material to rid it of the absorbed moisture and to thereby retain it in its true condition, whereby its effectiveness as insulating material does not depreciate, and whereby the fireless cooker principle of the oven is not detrimentally affected by its long and continued use.

The accompanying drawing is a perspective sectional view of an oven which embodies my invention.

Referring now to the drawings, it will be observed that the top, bottom and back of the oven comprise an inner metal lining 1, and an outer metal wall 2, with an insulating material 3, of asbestos or mineral wool located between these walls. The oven door 4 is also made up of an inner metal wall 5, and an outer metal wall 6, between which is located an insulating material 7. There may also be provided a third or supplementary outer wall 8, between which and the wall 6 is an air space 9. As is well-known the front wall of the oven is practically formed by the oven door.

In these cooking ovens the bottom wall is provided with an air inlet opening 10, and the back wall with an air outlet opening 11, located preferably at the top of the back wall, and there is provided a damper 12 for the inlet opening 10 and a damper 13, for the outlet opening 11. Suitable means (not here shown) is provided for opening and closing these dampers, but this mechanism forms no part of my present invention and need not, therefore, be disclosed, further than to say that when the oven is being heated by the gas burners 39, or other heating means, the dampers are open to provide a circulation of air within the oven, for a predetermined period of time according to the character of the food being cooked, and the dampers then closed and the heat cut off, the heat will be retained within the oven for the completion of the cooking operation, thus effecting a saving in the heating medium, as well as a convenience to the operator, because the cooking operation will need no further attention. For the purpose of determining the period of time that the heating is to continue, a thermometer 41 is provided, preferably in the door, from which the operator can see when the interior of the oven has reached the desired heat and when to close the dampers and cut off the source of heat.

For the purpose of retaining the heat from the burners or heater within the oven as effectively as possible, while the heating is going on and the dampers 12 and 13 are open, I provide a baffle plate 42 at the bottom of the oven just above the burner or heater 39, and the heat is directed against this plate and then deflected around its back and front edges and through openings 43, thus preventing the rapid passage of the heat from the lower part of the oven to its upper part, and the rapid passage of the heat from the oven above the baffle-plate to the outlet opening 11 is prevented by an upper baffle-plate 44. By this arrangement the heat is caused to pass around the space 45 at the front edge of the baffle plate 44 and over the top thereof to the outlet opening 11, the circulation being shown by arrows.

The ventilation of the insulating material 3 is provided through openings 47 formed in the top or outer wall 2 of the oven, and these openings are arranged entirely around the edge of the top wall and ventilating openings 48 are formed in the vertical edges of the back and front walls of the oven.

When the oven is embodied in a stove structure, the openings 47 will not be visible as they will ordinarily be concealed by an upper structure (not here shown) slightly separated from the upper wall and to conceal the openings 48 in the edges of the side walls of the oven and to provide baffle-plates for these ventilating openings, I provide the perforated combined concealing and baffling plates 51 for these edge openings, and at the rear corners the baffle-plates are made as integral pipes, as shown, and they will be held in position by any suitable binding 52.

I have discovered in the operation of an oven having the fireless cooker principle, that the ventilation here disclosed and described, permits the escape from the insulating material of any moisture that may enter it, and in that event prevents the insulating material from becoming clogged and losing its effectiveness as an insulation. This is so because the moisture from the oven enters the insulating material through the joints of the inner lining 1, which in stoves it is not practical to make absolutely tight. The locating of these ventilating openings approximately at the joints of the inner lining, provide a ventilation for the insulating material at the very points where the moisture enters it, and owing to the fact that the insulating material becomes warm, the moisture is immediately evaporated and finds its way through the ventilating openings. I have also found in the practical operation of my improved oven that this ventilation prevents any accumulation of moisture by the insulating material, and therefore preserves the insulating material in its original effectiveness.

It is apparent from the illustration of my invention that the insulating asbestos 3 is closed between the inner and outer walls 1 and 2, and the space between these walls is completely filled by the asbestos. In this construction the walls 1 and 2 form absolute supports completely engaging both surfaces of the asbestos. It is also apparent that there is no circulation of air in contact with the asbestos for ventilating it. To the contrary, the asbestos is heated by the heat within the oven and any odor or moisture which may escape into the insulating material by reason of a defect in the construction of the oven, is driven out of the asbestos by the heat and escapes through the ventilating openings in the edges of the outer wall of the oven.

Having thus described my invention, what I claim and desire to secure by Letters Patent is:

1. An oven of the fireless cooker principle, comprising an oven chamber having inner and outer walls, a filling of insulating material between the said walls and in engagement throughout the entire inner surface of the walls whereby the walls form a support for the insulating material, the outer wall having ventilating openings, and means within the oven for heating it whereby any odor or moisture within the insulating material is driven by the heat therefrom through the said ventilating openings.

2. An oven of the fireless cooker principle, comprising an oven chamber having inner and outer walls, and a filling of insulating material between the said walls, the insulating material engaging the walls throughout its surface whereby the walls form a positive and direct support for the insulating material, the outer wall having ventilating openings, a cover for the openings spaced from the outer wall, the said cover also having openings, and means for heating the oven.

3. An oven of the fireless cooker principle, comprising an oven chamber having inner and outer walls, a filling of insulating material between the walls and in direct contact therewith throughout its surface, whereby the walls form a support for the insulating material, the edges of the outer wall having ventilating openings, a combined cover and shield on the outside of the wall and located over and apart from the ventilating openings for the purpose described, and means for heating the oven.

4. An oven of the fireless cooker principle, comprising an oven chamber having inner and outer walls, a filling of insulating material between the walls, the outer wall having ventilating openings for the insulating material, and heating means within the oven whereby the insulating material is heated and moisture and odor driven therefrom through the ventilating openings of the outer wall.

In testimony whereof I hereunto affix my signature in the presence of two witnesses.

GUY B. CHILD.

Witnesses:
CHARLES MUNZNER,
HY. MOECKER, Jr.

Copies of this patent may be obtained for five cents each, by addressing the "Commissioner of Patents, Washington, D. C."